United States Patent [19]

Geist

[11] 4,033,137
[45] July 5, 1977

[54] ARTICULATED FLOATING BARRIER

[76] Inventor: James J. Geist, 31 Tilton St., New Haven, Conn. 06511

[22] Filed: July 12, 1973

[21] Appl. No.: 378,419

[52] U.S. Cl. ................................................. 61/1 F
[51] Int. Cl.² ........................................ E02B 15/04
[58] Field of Search .................. 52/573, 593, 595; 61/1 F, 5; 160/135, 235

[56] References Cited

UNITED STATES PATENTS

| 3,286,423 | 11/1966 | Donlon | 52/593 X |
| 3,359,594 | 12/1967 | Pastoor | 160/235 X |
| 3,596,701 | 8/1971 | Cowan | 160/135 |
| 3,686,870 | 8/1972 | Blomberg | 61/1 F |
| 3,744,253 | 7/1973 | Williams et al. | 61/1 F |
| 3,766,738 | 10/1973 | Gauch | 61/1 F |
| 3,800,542 | 4/1974 | Cesari | 61/1 |

FOREIGN PATENTS OR APPLICATIONS

| 494,989 | 6/1954 | Italy | 61/1 F |
| 54,003 | 6/1922 | Sweden | 61/1 F |

Primary Examiner—Paul R. Gilliam
Assistant Examiner—David H. Corbin
Attorney, Agent, or Firm—Kenyon & Kenyon, Reilly, Carr & Chapin

[57] ABSTRACT

A barrier for containing oil spills or other debris on the surface of a body of water includes buoyant sections connected by a sliding seal for allowing sliding relative vertical motion and limited relative angular movement between the sections to accommodate extreme and abrupt variations in water surface level and turbulence resulting from wave action. The seal connection is made up of a vertical inner slide member, either integral with or attached to one end of one section, and a mating outer member integral with or attached to the opposite end of a similar section, the outer member having an undercut, open-ended slot for engaging the slide member with sufficient clearance to permit relative vertical sliding movement between the members while at the same time providing an effective seal between the sections. The inner slide member is preferably in the form of a cylindrical rod, and the opening of the mating slot in the outer member is preferably wide enough to permit limited relative angular movement between the two sections in the horizontal plane so that the connection serves as a combination sliding seal and hinge.

5 Claims, 7 Drawing Figures

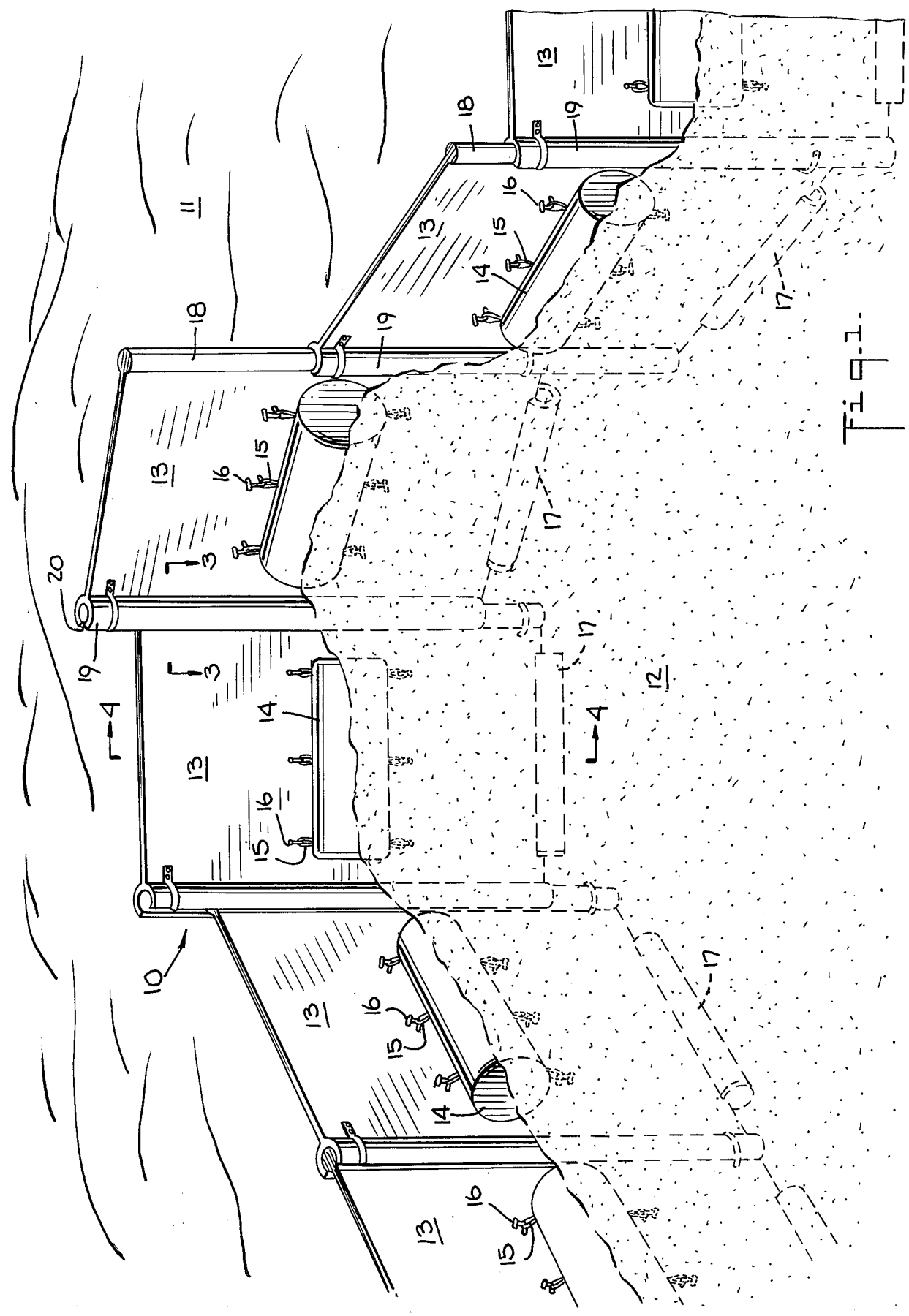

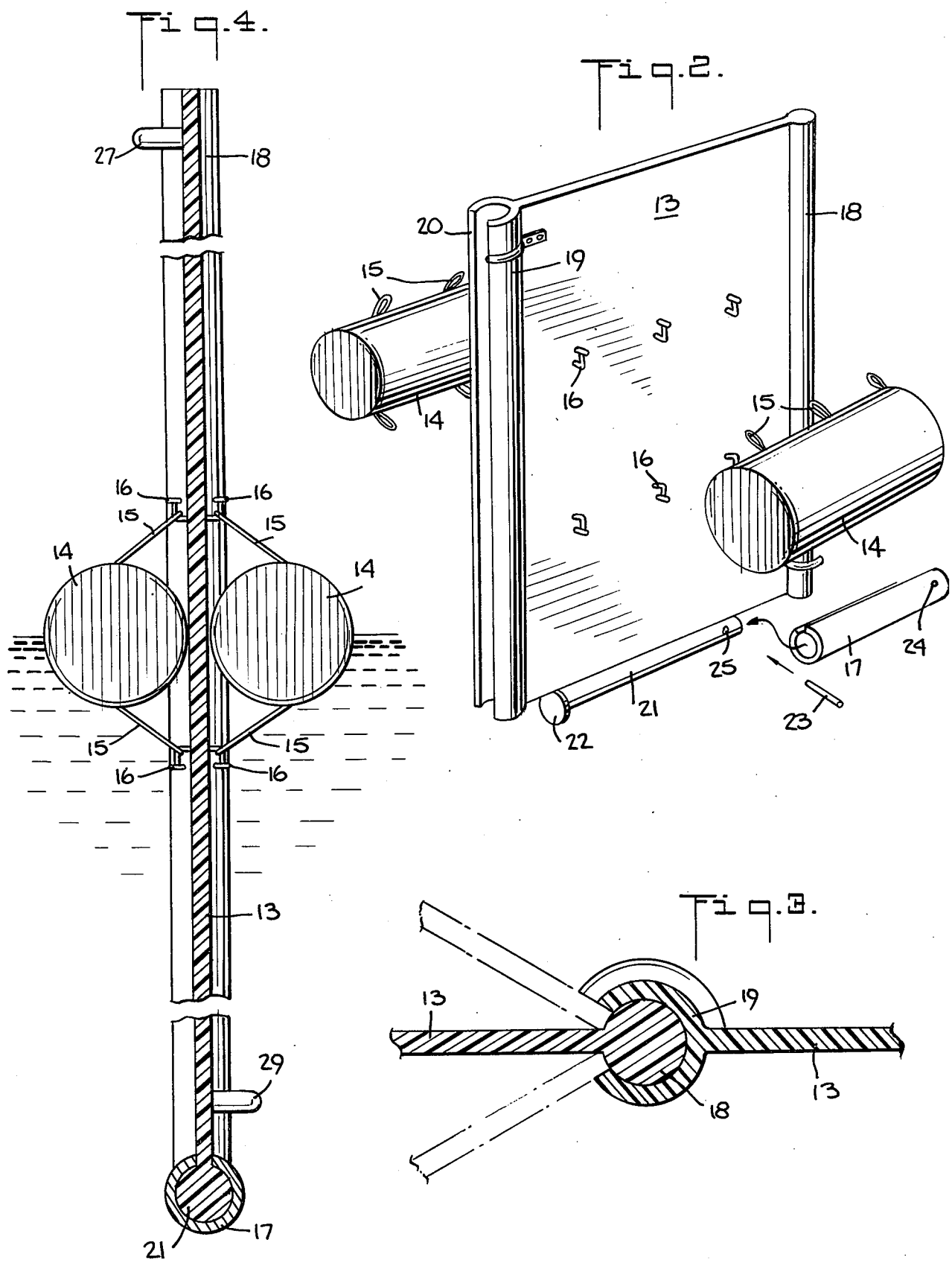

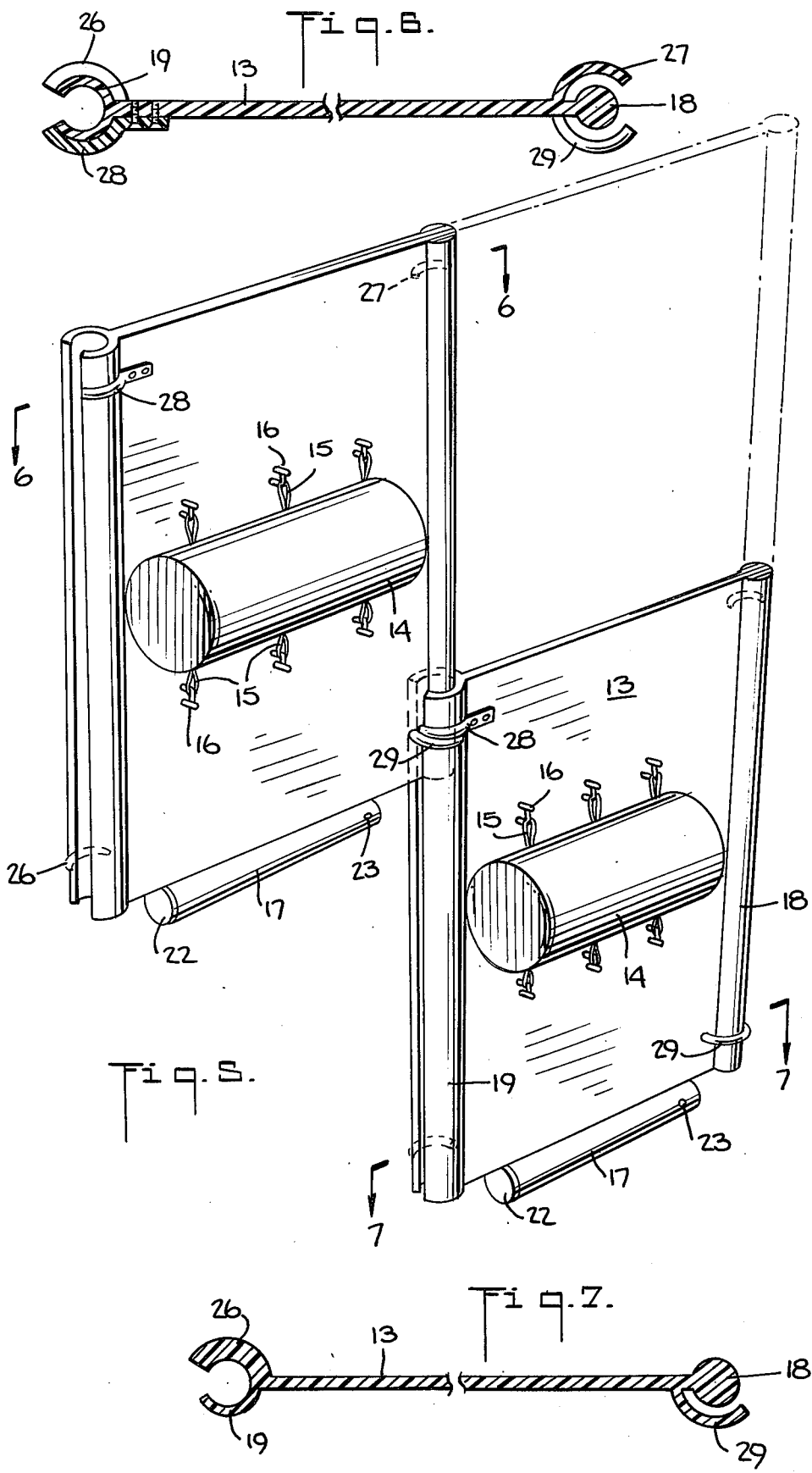

ARTICULATED FLOATING BARRIER

BACKGROUND

1. Field of the Invention

The present invention relates to floating barriers for containing or controlling oil or other matter on the surface of a body of water for removal or recovery of the matter, to direct its flow, or to exclude contamination, and the invention relates particularly to floating barriers having a plurality of articulated buoyant sections.

2. Description of the Prior Art

With the growth of concern over the environmental impact of oil spills from tankers or other vessels or from leaking offshore oil and gas wells there have been numerous proposals for floating barriers or booms to contain and collect such surface contamination. These barriers fall roughly into two basic categories, "continuous" type or "segmented" type.

The continuous type barrier is usually constructed of pliable material throughout its length and therein achieves wave profile adaptability. It normally has a flexible elongated float or series of floats that serve as a surface barrier and from which depends a sub-surface curtain of pliable material to prevent eddy currents from carrying the oil under the barrier. In the segmented type, a series of articulated buoyant sections are linked by pliable material or hinges to permit relative movement between sections in a substantially vertical plane to prevent matter from being splashed over the barrier as well as from being carried underneath it.

Examples of continuous type barriers are disclosed in U.S. Pat. No. 3,564,852, issued on Feb. 23, 1971 to M. F. Smith; U.S. Pat. No. 3,577,879, issued on May 11, 1971 to R. E. Ducrocq; U.S. Pat. No. 3,579,994, issued on May 25, 1971 to P. Preus and C. E. Rosendahl; U.S. Pat. No. 3,592,006, issued on July 13, 1971 to A. M. Crucet; U.S. Pat. No. 3,599,434, issued on Aug. 17, 1971 to L. Missud; U.S. Pat. No. 3,608,316, issued on Sept. 28, 1971 to J. E. Manuel; U.S. Pat. No. 3,613,376, issued on Oct. 19, 1971 to B. Midby, U.S. Pat. No. 3,613,377, issued on Oct. 19, 1971 to R. E. Zaugg; U.S. Pat. No. 3,630,033, issued on Dec. 28, 1971 to R. L. Tuttle; U.S. Pat. No. 3,648,463, issued on Mar. 14, 1972 to R. R. Ayers; and U.S. Pat. No. 3,667,235, issued on June 6, 1972 to P. Preus and J. J. Gallagher.

The flexibility of continuous type barriers, particularly continuous curtains, permits them to conform to gentle waves on the water surface, but the flexibility of the curtain material also allows the bottom of the barrier to balloon out and let oil pass underneath if the barrier is anchored in a current or is being used as a towed collection boom. The float's flexibility is limited, and necessarily prevents full adaptation of the barrier to wave profile in heavy waters; this results in wave action lifting the barrier above the surface of troughs between waves and permits escape of the matter to be contained. In addition, the freeboard of curtain type barriers is limited by the height of the floats, so that oil can splash over the top. Larger floats on rigid pontoons can be used, of course, but these further decrease flexibility of the barrier.

Continuous barriers, particularly the inflatable float type, can be made in relatively long lengths yet be folded for stowage. Because of the flexibility of the curtain material used in many versions of this type of barrier, flexible connections between lengths are not essential.

The sections of segmented barriers, on the other hand, can provide high freeboard and deep draft, but these barriers require some sort of flexible connecting links between the adjacent relatively rigid sections in order to conform to wave profiles. At the same time, the connections must provide an effective seal to prevent the escape of oil between the sections.

Examples of segmented barriers are disclosed in U.S. Pat. No. 3,592,005, issued on July 13, 1971 to E. C. Greenwood; U.S. Pat. No. 3,592,008, issued on July 13, 1971 to B. A. Trindle; and U.S. Pat. No. 3,645,099, issued on Feb. 29, 1972 to M. Saavedra.

In the Greenwood barrier, adjacent sections are connected by vertical axis hinges alternating with horizontal axis hinges to provide alternate hinge motion in two directions. The hinge links provide no sealing between panels, however, and must be supplemented by sheets of pliable material sealingly attached to the adjacent section ends.

The buoyant sections in the Trindle patent are connected by vertical hinges that allow limited relative angular motion between sections in the horizontal plane but essentially no relative motion in the vertical plane. The individual sections of the Trindle barrier are relatively large (20 feet long by 10 feet high), and the barrier is intended to form a relatively rigid floating wall that does not follow individual wave fluctuations. Thus, it is effective only in situations where the waves are less than the freeboard of the sections.

The sections in the Saavedra U.S. Pat. No. 3,645,099 are also connected together by a vertical axis hinge arrangement to allow relative angular motion in the horizontal plane. Relative vertical displacements are permitted by regions of accordionpleated pliable material in the center of each panel section. Other examples of the use of the accordion principle to obtain flexibility combined with vertical stiffness in a sealed barrier include U.S. Pats. No. 3,597,924, issued on Aug. 10, 1971 to M. Rising and U.S. Pat. No. 3,611,728, issued on Oct. 12, 1971 to G. Van't Hof. Disadvantages of the accordion or fan-pleated concept are that the vertical displacement permitted is very limited and that a substantial amount of material is required for a given barrier length, with attendant increased weight and difficulty of handling.

Another prior device for connecting adjacent buoyant sections of a segmented type barrier in an articulated manner is disclosed in Swedish Pat. No. 54,003 issued in 1923. It consists of a pair of vertical plates arranged in side-by-side partially overlapping relation and pinned together near the top by a horizontal pin so that the overlapping plates can slidably rotate with respect to each other about the horizontal axis of the pin. Two tapered vertical pins, one pin welded along the outside vertical edge of each plate, slip into mating vertical slots on the ends of each of two adjacent sections so that the tapered pins of the double-plate connecter can be wedged into the corresponding slots of the adjacent sections to link them together, yet the barrier can be disassembled by lifting the double-plate connecter to withdraw the tapered pins from the slots. In the assembled condition, the tapered pins are intended to be wedged tightly into the slots, and the only motion between sections in the vertical plane is hinge motion about the axis of the above-mentioned horizontal pin. This pin must withstand all of the forces acting between adjacent sections and is a potential weak point in the connection.

SUMMARY OF THE INVENTION

It is an object of the present invention to provide a segmented floating barrier having a simple yet rugged connection between adjacent buoyant sections that permits maximum relative vertical motion between the sections while maintaining an effective seal between them.

It is another object of the invention to provide a barrier as described above in which the connection between sections also permits limited relative angular motion in the horizontal plane.

The invention comprises a plurality of generally rectangular buoyant arranged in end-to-end relation and means for sealingly connecting adjacent sections so as to allow relative vertical sliding motion and limited relative angular motion in the horizontal plane between the sections.

The preferred embodiment of the connecting means includes a vertically disposed slide member sealingly attached to one end of one section and a member having a mating, undercut slot sealingly attached to the adjacent end of another section. The undercut slot engages the slide member with sufficient clearance to permit relative vertical sliding motion and relative horizontal angular motion between the sections while at the same time maintaining an effective seal against escape of the contained oil.

The slide member is preferably in the form of a cylindrical rod attached directly to or forming a vertical edge of the one section, and the mating slotted member is preferably in the form of a hollow tube attached to or forming the adjacent edge of the other section and having an elongated, outward-facing opening through the tube wall for its entire length. The opening is wider than the thickness of the one section where it attaches to the slide member to allow limited angular movement between the sections, with the cylindrical rod serving as a hinge pin and the hollow tube as a hinge journal. In this manner, the preferred connecting means functions simultaneously to permit relative vertical translational and horizontal angular motion between adjacent buoyant sections while also sealing against escape of contained oil or other contaminating liquid on the surface of the water.

To limit the amount of relative vertical motion between sections and prevent disengagement in very heavy waves, stop means are provided near each end of the slide members and mating slotted members. In a preferred arrangement, a first stop means secured to the outer surface of the slotted member near its upper end on one side of one buoyant section abuts against a second stop means secured on the same side of the adjacent section near the lower end of the mating slide member to limit relative vertical movement between the sections in one direction. Similarly, a third stop means secured to the outer surface of the slotted member near its lower end of the other side of the one section abuts against a fourth stop member secured on the other side of the adjacent section near the upper end of the mating slide member to limit relative movement between the sections in the other direction. This preferred arrangement allows total relative vertical sliding movement between sections greater than the length of the sliding member or the mating slotted member, a far greater relative movement than permitted by any of the prior art barriers described above.

Although the buoyant sections can be generally rectangular units of any desired cross section, including the various types of hollow pontoons, of the prior art, the preferred barrier section is a flat rectangular panel; so that a large number of sections can be stacked in a small space for storage and transport to the site of use. The panels can be made of any suitable material having the requisite strength, resistance to corrosion, and impermeability.

A panel material preferred for many applications is a rectangular sheet of plastic, but other materials such as aluminum, glass fiber-reinforced plastic, or marine plywood can be used. Alternatively, the panel can be made up of an impervious fabric or plastic membrane stretched on a rectangular frame. The choice of material is largely dictated by considerations of cost, weight, ease of maintenance, and conditions of use, storage and deployment.

If the barrier section is a flat panel, it is desirable to attach flotation means such as inflatable bags, hollow drums, foamed plastic floats, or the like, preferably to both sides of the panel so that it will float in a stable upright position.

Ballast means can also be attached to the bottoms of the panels to increase their stability. A preferred ballasting means comprises an elongated weight attached along the bottom edge of each pannel by sliding a longitudinal undercut slot in the weight over a mating bulge or bulges formed in the bottom edge of the panel. Alternatively, ballast means could be made up of lengths of heavy chain permanently or detachably fastened through holes along the bottom of each panel or of weights encased in plastic or fabric bags similarly attached to or molded into the bottom portion of each panel.

BRIEF DESCRIPTION OF THE DRAWINGS

The preferred structure of the present invention will be more fully understood from the following description and the accompanying drawings, in which:

FIG. 1 is a perspective view of an assembled preferred embodiment of the barrier according to the invention;

FIG. 2 is a perspective view of one section of the barrier of FIG. 1 showing disassembled flotation means and ballasting means in proper relation for attachment to the section;

FIG. 3 is a plan view in section of a portion of two assembled sections of the barrier of FIG. 1 taken along line 3—3 and illustrating the limited angular motion between sections permitted by the connection means of the invention;

FIG. 4 is an and elevation in section of a barrier section taken along line 4—4 of FIG. 1;

FIG. 5 is a perspective view of two assembled sections of the barrier of FIG. 1 illustrating the limit of relative vertical motion between sections in one direction;

FIG. 6 is a plan view in section of one of the barrier sections of FIG. 5 taken along line 6—6.

FIG. 7 is a plan view in section of the other barrier section of FIG. 5 taken along line 7—7.

DESCRIPTION OF THE PREFERRED EMBODIMENT

Referring to FIG. 1, a portion of an articulated segmented barrier 10 floats on a body of water 11 to contain an oil spill 12. The barrier comprises a plurality of buoyant sections in the form of flat rectangular panels 13 supported in an upright position by flotation means in the form of floats 14 attached by loops 15 to hooks 16 on the sides of the panels approximately midway between the top and bottom. Ballasting means in the form of weights 17 stabilize the panels in the upright position by increasing their metacentric height (e.g. the vertical distance between their center of gravity and center of buoyancy).

The buoyant sections of the barrier in FIG. 1 are connected end-to-end by means that serve as a sliding seal to allow relative vertical movement and limited angular motion in the horizontal plane between adjacent sections while effectively preventing escape of the contained oil. In the illustrated embodiment, the connection means includes a slide member in the form of a vertically disposed cylindrical rod or hinge pin 18 extending along one end of each panel 13 and a member having a mating undercut slot in the form of a vertically disposed tubular hinge journal 19 extending along the opposite end of each panel. Hinge journals 19 have outward-facing, longitudinal openings or cuts 20 extending along their entire length, openings 20 being wide enough to accommodate the thickness of the adjacent panel when its hinge pin is slidingly engaged by the hinge journal, with sufficient additional clearance to permit limited angular motion between the adjacent panels (as shown more clearly in FIG. 3).

FIGS. 2 through 7 show the construction of each panel in more detail and also the manner of assembly of the sections to form the articulated barrier (FIG. 5). Referring particularly to FIGS. 2 and 4, the ballast weight 17 is in the form of a slotted pipe which is easily and detachably secured to the bottom of a panel 13 by sliding it over a cylindrical enlargement 21 until it fetches against a stop 22 at one end of the enlargement and then inserting a friction pin 23 through a hole 24 in weight 17 that is aligned with a hole 25 in enlargement 21.

A pair of floats 14 is attached to opposite sides of the panel to support it as nearly vertical as possible. The floats are preferably elongated and attached horizontally so that the panel will tend to float with its ends vertical. The floats can be inflatable, which allows them to be deflated for storage, or they can be of rigid hollow construction or filled with a buoyant material such as foamed plastic to maintain their buoyancy in the event of a leak.

Instead of the illustrated loop and hook arrangement, any other suitable means can be used to attach the floats to the panels, but the arrangement shown is preferred for attachment of inflatable floats which can be stored, deflated, attached to the panel, for example. Also, many other forms of ballasting weights can be used, such as those disclosed above and in the prior art referred to earlier. The illustrated arrangement is preferred for ease of assembly and disassembly into components that are lighter and easier to handle than the fully assembled panel.

In addition, the tubular form of ballast weight 17 supplies strength and rigidity to the bottom of the panel. In the same manner, the hinge pin 18 and hinge journal 19 reinforce the panel ends. If desired, further reinforcement can be extended along the top edge of the panel.

The panel itself can be formed integrally with hinge pin 18 and hinge journal 19 of some suitable material such as glass fiber reinforced plastic. Such material has the additional advantage of having a smooth surface that can be easily cleaned without laborious hand scrubbing.

Referring particularly to FIGS. 5–7, the sliding hinge arrangement of the present invention permits extensive relative vertical motion between adjacent panels in response to high wave profile so that at all times the waterline remains at approximately the midpoint of each panel.

An arrangement of stops prevents the vertical disengagement of sections, that is of the hinge pins from the hinge journals in heavy seas, thereby preserving the structural integrity of the barrier. Each section includes a first stop 26 in the form of a circumferential bulge on one side of the hinge journal 19 near its lower end and a second stop 27 in the form of a curved bar partially encircling and radially spaced from the hinge pin 18 near its upper end on the same side of the panel. The second stop 27 loosely surrounds the tubular hinge journal 19 of an adjacent panel when the two are assembled and abuts against the first stop 26 to limit the downward travel of the hinge pin in the hinge journal. The location of the stops is chosen to permit the greatest possible vertical movement between panels while still maintaining sufficient engagement of the pin in the journal to assure the two sections will not jam or pull apart.

Similarly, a third stoop 28 identical to the first stop is located on the other side of each hinge journal 19 near its upper end, and a fourth stop 29 similar to the second stop is located near the lower end of the hinge pin 18 on the same side of the panel as stop 28. The fourth stop 29 thereby abuts against the third stop 28 to limit the upward travel of the hinge pin in the hinge journal of the adjacent panel, as shown in FIG. 5.

It is desirable that at least one of the stops be detachable from the panel to permit assembly and disassembly of the barrier. In the figures, third stop 28 is illustrated as detachably fastened to the panel.

The illustrated construction of the sections is particularly suited to a lightweight barrier that can be compactly stored as disassembled panels yet can be easily transported and assembled at the site of an accidental oil spill without the need for heavy lifting equipment. For example, panel dimensions for a typical application may be on the order of 9 feet high by 5 feet wide. If the panel is a sheet of ½ inch plastic material, for example, it can be easily handled by two men without any equipment.

When assembling the barrier at an oil spill site, floats and ballast weights will first be attached to each panel (if not stored attached to the panel). The panel is then lowered into the water from a barge, dock or boat. A second panel is then lowered in end-to-end relation to the first panel and the hinge pin of one panel slidingly fitted into the hinge journal of the other. When the two panels are assembled together, the detachable stop should be positioned to prevent subsequent disengagement of the panels.

The process is then repeated until a barrier of the desired length has been assembled. After the oil spill has been cleaned up, the barrier can be disassembled for cleaning and storage by reversing the assembly process.

The invention is equally adaptable to in-water storage, fully assembled, and to more permanent installations such as might be anchored around offshore drilling and pumping platforms. The buoyant sections of such a permanent barrier would normally be of much heavier construction, possibly in the form of hollow rectangular pontoons or caissons, but the same simple sliding seal arrangement can be used to connect the sections together.

A preassembled version of the barrier suitable for immediate emergency deployment (i.e. from a leaking oil tanker) would be constructed of materials suitable for this purpose; for example, panels would be made of an impermeable flexible membrane stretched on a rigid lightweight frame, with multiple or dual ballast means and inflatable flotation means sewn or molded directly onto the membrane. As the sections would be stored joined together, with the stop means in place, the horizontal members of the fame would be fitted with hinges permitting each section to fold flat upon itself in either direction. Because the slide members provide all the desired relative angular horizontal movement, the hinges in the horizontal frame members are used for storage purposes only. The panel would be braced open by the inflated flotation devices and also might be fitted with locking clips on the frame hinges which would be set when the barrier is unfolded for deployment in the water.

From the foregoing description it will be apparent that the articulated floating barrier of the present invention combines simplicity of structure with flexibility of function by providing a connection between buoyant sections that does not require a separate linking member and permits substantial and abrupt relative vertical motion between sections as well as horizontal angular motion, limited in extent to assure against inward collapse of the barrier. At the same time the sliding hinge connection prevents escape of the matter being contained by the barrier without the need for supplemental fabric or membrane seals that can puncture or tear.

Because the vertical movement is a sliding action, with a capacity for both horizontal and vertical movement between two rigid sections, rather than a wrinkling or folding of a flexible membrane linkage, the design of the present invention permits an open sea barrier that adapts to high waves thereby creating greater effective freeboard and draft than was possible with the prior art designs.

I claim:

1. An articulated floating barrier for containing oil or other debris on the surface of a body of water comprising:
   a plurality of buoyant sections, each section being substantially rectangular in profile and having a top, a bottom, and two ends and having its center of buoyancy located above its center of gravity so that the section will float stably upright in a body of water with its top and bottom substantially horizontal and its ends substantially vertical and
   sliding seal means attached to adjacent ends of adjacent sections for sealingly connecting the adjacent sections end to end while allowing relative vertical sliding motion between the sections in response to wave-created differential buoyant forces acting on the adjacent sections, wherein the sliding seal connecting means comprising:
   a vertical disposed slide member sealingly attached to one end of one section and
   a mating slotted member sealingly attached to the adjacent end of the adjacent section, the slotted member being open ended and slidably engaging the slide member to permit relative vertical sliding movement of the slide member beyond each end of the slotted member as a result of wave-created differential buoyant forces acting on the adjacent sections.

2. The barrier of claim 1 wherein the slide member comprises a cylindrical rod, and the mating slotted member comprises a cylindrical openended tubular structure having an opening through the tube wall extending for the full length of said tubular structure to provide an undercut slot for slidably receiving the cylindrical rod, said opening being wide enough to permit limited angular rotation as well as axial translation of the rod in the slot to provide hinging movement in the horizontal plane between adjacent sections.

3. The barrier of claim 2 further comprising:
   first stop means fastened on one side of the slotted member near one of its ends;
   second stop means fastened in spaced relation to the mating slide member on a side of the one section corresponding to the one side of the slotted member near the end of the slide member opposite to the one end of the slotted member for abutting against the first stop means when the vertical motion of the one section relative to the other section in the direction of the one end of the slotted member as a result of wave action reaches a first predetermined limit position;
   third stop means fastened on the other side of the slotted member near its other end; and
   fourth stop means fastened on the other side of the mating slide member on a side of the one section corresponding to said other side of the slotted member near the end opposite the other end of the slotted member for abutting against the third stop means when the vertical motion of the one section relative to the other section in the direction of the other end of the slotted member as a result of wave action reaches a second predetermined limit position.

4. A floating barrier for containing oil or other matter on a body of water, the barrier having a plurality of articulated sections wherein each section comprises:
   a rectangular panel;
   flotation means attached to the panel for buoyantly supporting a substantial portion of the panel above the surface of the water; and
   means for ballasting the panel so that it is supported by the flotation means with two edges substantially vertical;
   a member defining a hinge pin attached to and extending parallel to one vertical edge of the panel;
   a member defining a slotted hinge bearing attached to and extending parallel to the opposite vertical edge of the panel, the slotted bearing member on one panel mating with the hinge pin of another panel with sufficient clearance for free axial sliding movement of the hinge pin beyond each end of the slotted bearing member to allow relative vertical movement between the panels in response to wave-created differential buoyant forces acting on the panels and the opening of the slot being wide enough to permit limited angular movement of the one panel relative to the other panel;

first stop means secured to the outer surface of the slotted member on one side of the panel near one corner;

second stop means secured in spaced partially encircling relation to the hinge pin member on the one side of the panel near a second corner diagonally opposite to the one corner;

third stop means secured to the outer surface of the slotted member on the other side of the panel near a third corner; and fourth stop means secured in spaced partially encircling relation to the hinge pin member on the other side of the panel near the fourth corner, whereby the first stop means of one panel will abut against the second stop means of a mating adjacent panel to prevent the hinge pin member of the adjacent panel from sliding out of engagement with the slotted member of the one panel in one direction in response to differential buoyant forces of one sign created by wave action acting on the panels, and the third stop means of the mating panel will abut against the fourth stop means of the one panel to prevent the hinge pin member of the adjacent panel from sliding out of engagement with the slotted member of the one panel in the other direction in response to differential buoyant forces of the opposite sign created by wave action acting on the panels.

5. The barrier section of claim 4 wherein one of the stop means is detachably secured to the panel for permitting engagement and disengagement of the hinge pin member of one panel with the slotted member of another panel when respectively assembling and disassembling the barrier.

* * * * *

UNITED STATES PATENT AND TRADEMARK OFFICE
CERTIFICATE OF CORRECTION

PATENT NO. : 4,033,137
DATED : July 5, 1977
INVENTOR(S) : James J. Geist

It is certified that error appears in the above-identified patent and that said Letters Patent are hereby corrected as shown below:

Column 3, line 61: "of", first occurrence, should be --on--;

Column 6, line 34: "stoop" should be --stop--;

Column 7, line 68: "comprising" should be --comprises--;

Column 8, line 1: "vertical" should be --vertically--;

Column 8, line 37: "on the other side of" should be --in spaced relation to--.

Signed and Sealed this

Eleventh Day of October 1977

[SEAL]

Attest:

RUTH C. MASON
Attesting Officer

LUTRELLE F. PARKER
Acting Commissioner of Patents and Trademarks